(12) United States Patent
Iriuchijima et al.

(10) Patent No.: US 8,144,436 B2
(45) Date of Patent: Mar. 27, 2012

(54) HEAD SUSPENSION

(75) Inventors: Osamu Iriuchijima, Aikoh-gun (JP); Hideki Fuchino, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 119 days.

(21) Appl. No.: 12/784,086

(22) Filed: May 20, 2010

(65) Prior Publication Data

US 2010/0296196 A1 Nov. 25, 2010

(30) Foreign Application Priority Data

May 25, 2009 (JP) .............................. P2009-124887

(51) Int. Cl.
*G11B 5/56* (2006.01)

(52) U.S. Cl. .................................................. 360/294.4
(58) Field of Classification Search ................ 360/294.4
See application file for complete search history.

(56) References Cited

U.S. PATENT DOCUMENTS

| | | | | |
|---|---|---|---|---|
| 6,327,120 B1* | 12/2001 | Koganezawa et al. | ..... | 360/294.4 |
| 2002/0064001 A1* | 5/2002 | Shiraishi et al. | ........... | 360/294.4 |
| 2002/0075606 A1* | 6/2002 | Nishida et al. | ............. | 360/294.4 |
| 2002/0089793 A1* | 7/2002 | Nakagawa et al. | ........ | 360/294.4 |
| 2003/0123196 A1* | 7/2003 | Shiraishi et al. | ........... | 360/294.4 |

FOREIGN PATENT DOCUMENTS

| | | | |
|---|---|---|---|
| JP | 2001339967 A | * | 12/2001 |
| JP | 2002-184139 | | 6/2002 |
| JP | 2002-184140 | | 6/2002 |

* cited by examiner

*Primary Examiner* — David D Davis
(74) *Attorney, Agent, or Firm* — Jordan and Hamburg LLP

(57) ABSTRACT

A head suspension has a load beam and a piezoelectric actuator. The piezoelectric actuator has an actuator base connected to a base part of the load beam and a piezoelectric element attached to an opening formed in the actuator base. The piezoelectric actuator displaces a front end of the load beam in a sway direction according to deformation of the piezoelectric element that occurs in response to a voltage applied thereto. The head suspension includes a nonconductive adhesive filled between the piezoelectric element and the opening, to fix the piezoelectric element to the opening and a trap formed on the actuator base outside the opening, to hold the nonconductive adhesive oozing out of the opening and prevent the oozed adhesive from spreading. The trap prevents the oozed adhesive from contaminating the periphery of the opening.

6 Claims, 11 Drawing Sheets

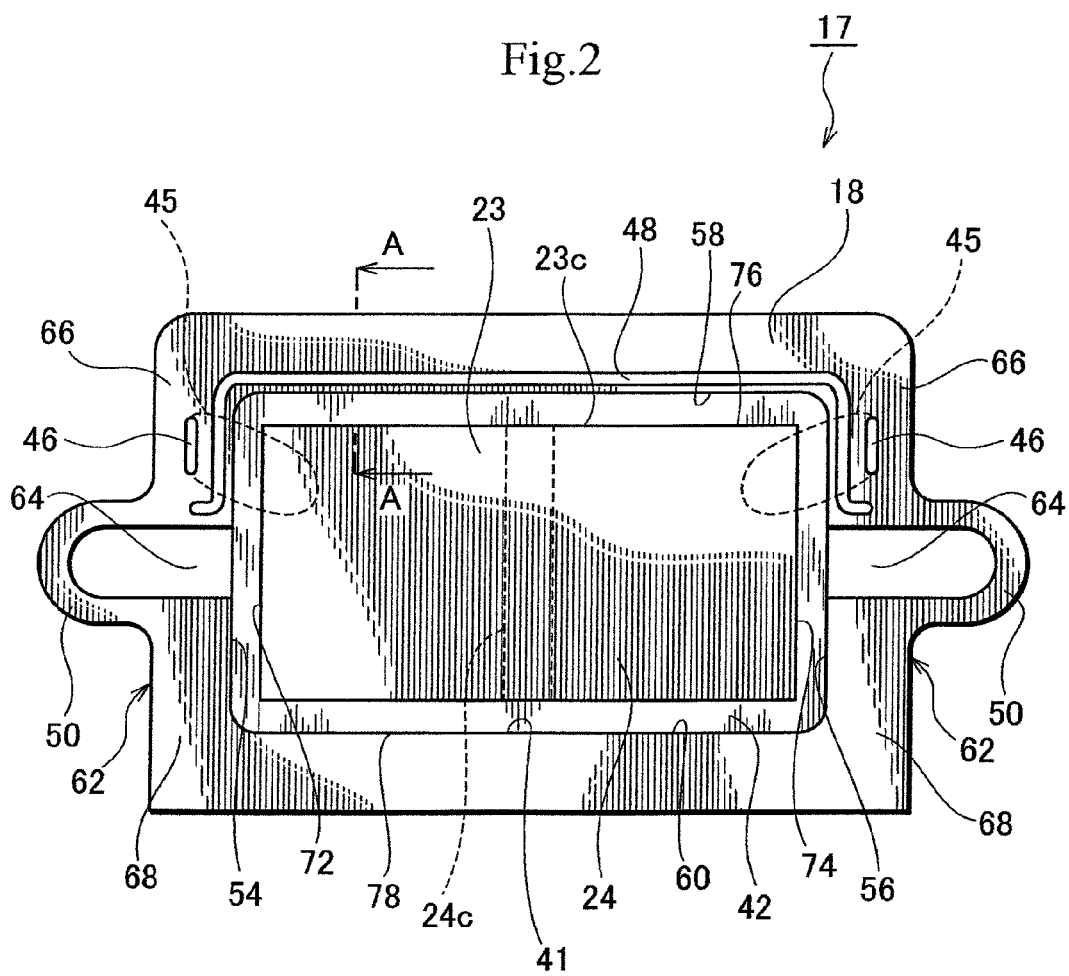

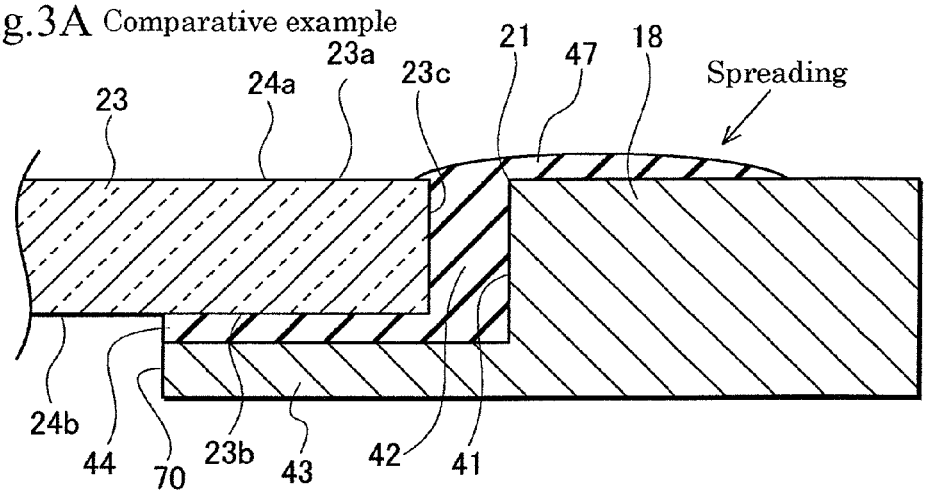
Fig.3A Comparative example
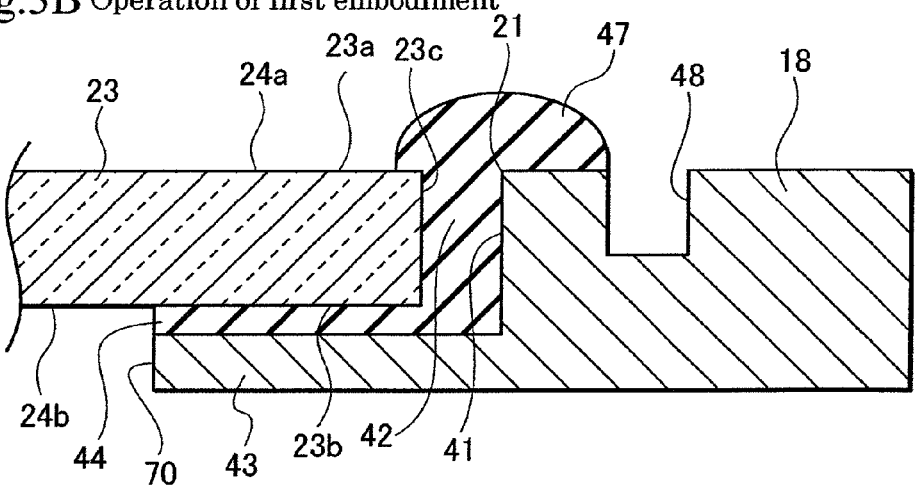
Fig.3B Operation of first embodiment
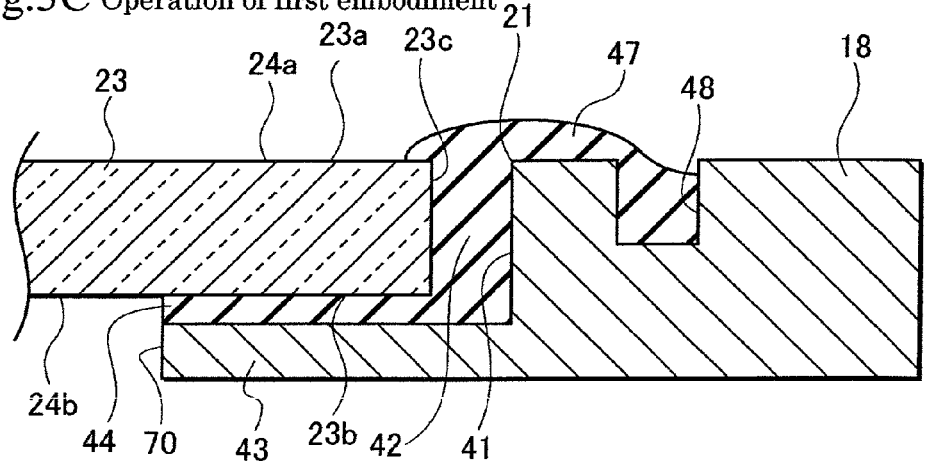
Fig.3C Operation of first embodiment

HEAD SUSPENSION

BACKGROUND OF THE INVENTION

1. Field of the Invention

The present invention relates to a head suspension for a disk drive incorporated in an information processing apparatus such as a personal computer, and particularly, to a head suspension having a piezoelectric element that is attached thereto with a nonconductive adhesive and deforms in response to an applied voltage.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

The magnetic disk drives are strongly expected to increase their storage capacities. Increasing the storage capacity of a magnetic disk drive is achievable by increasing the storage capacity of each magnetic disk in the magnetic disk drive. The storage capacity or recording density of a magnetic disk will increase, without changing the diameter thereof, if the number of tracks per inch (TPI) on the magnetic disk increases, i.e., if the width of a track narrows. For this, a magnetic head of a head suspension installed in the magnetic disk drive must conduct a precise positioning operation in a direction across the tracks, i.e., a sway direction. For realizing the precise positioning operation, an actuator capable of accurately moving and positioning the magnetic head in a very small section is needed.

To meet the need, a head suspension for a disk drive has been proposed in Japanese Unexamined Patent Application Publication No. 2002-184140. The head suspension includes a base plate, a connection plate having a hinge thinner than the base plate, a load beam provided with a flexure, and a piezoelectric actuator having a pair of piezoelectric elements.

This related art employs a dual actuator system that involves, for a precise positioning purpose, a voice coil motor and the piezoelectric actuator having two piezoelectric elements made of, for example, PZT (lead zirconate titanate).

The piezoelectric actuator in the dual actuator system minutely moves a front end of the load beam in a widthwise direction (sway direction) of the head suspension. Compared with a single actuator system employing only the voice coil motor, the dual actuator system is capable of more precisely positioning a magnetic head attached to a front end of the head suspension.

An important issue for the head suspension employing the dual actuator system is to protect the brittle piezoelectric elements from damage and secure electric insulation between the head suspension body and the piezoelectric elements.

One approach to address the issue is disclosed in Japanese Unexamined Patent Application Publication No. 2002-184139. This related art is a head suspension for a disk drive, having an actuator base and a piezoelectric element. The piezoelectric element is attached with a nonconductive adhesive to an opening formed in the actuator base. The adhesive covers a circumferential end face of the piezoelectric element.

This related art is capable of protecting the piezoelectric element from being damaged, preventing particles from dropping off the surface of the piezoelectric element, and securing insulation between the piezoelectric element and the actuator base.

The related art, however, has a possibility of, when attaching the piezoelectric element to the opening, oozing the nonconductive adhesive out of the periphery of the opening and spoiling the vicinities of the opening.

SUMMARY OF THE INVENTION

An object of the present invention is to provide a head suspension capable of preventing the periphery of an opening of the head suspension to which a piezoelectric element is attached with a nonconductive adhesive from being spoiled with the nonconductive adhesive.

In order to accomplish the object, an aspect of the present invention provides a head suspension having a load beam and a piezoelectric actuator, the piezoelectric actuator supporting a base part of the load beam and configured to displace a front end of the load beam in a sway direction. The piezoelectric actuator has an actuator base and at least a piezoelectric element, the actuator base connected to the base part of the load beam and having at least an opening, the piezoelectric element attached to the opening and deforming in response to a voltage applied thereto to conduct displacement of the front end of the load beam. The head suspension includes a nonconductive adhesive filled between the piezoelectric element and the opening, to fix the piezoelectric element to the opening and a trap formed on the actuator base outside the opening, configured to hold the nonconductive adhesive oozing out of the opening and prevent the oozed adhesive from spreading.

According to this aspect of the present invention, the trap holds the nonconductive adhesive if it overflows to the periphery of the opening, thereby preventing the nonconductive adhesive from diffusing and spoiling the periphery of the opening.

BRIEF DESCRIPTION OF THE DRAWINGS

FIG. 2 is a plan view illustrating a piezoelectric actuator of the head suspension of FIG. 1;

FIGS. 3A to 3C are sectional views taken along a line A-A of FIG. 2, in which FIG. 3A illustrates an adhesive diffusing state according to a comparative example and FIGS. 3B and 3C illustrate an adhesive stopped state according to the first embodiment;

DETAILED DESCRIPTION OF EMBODIMENTS

Head suspensions and piezoelectric actuators used with the head suspensions according to embodiments of the present invention will be explained in detail with reference to the drawings.

Figure 1:
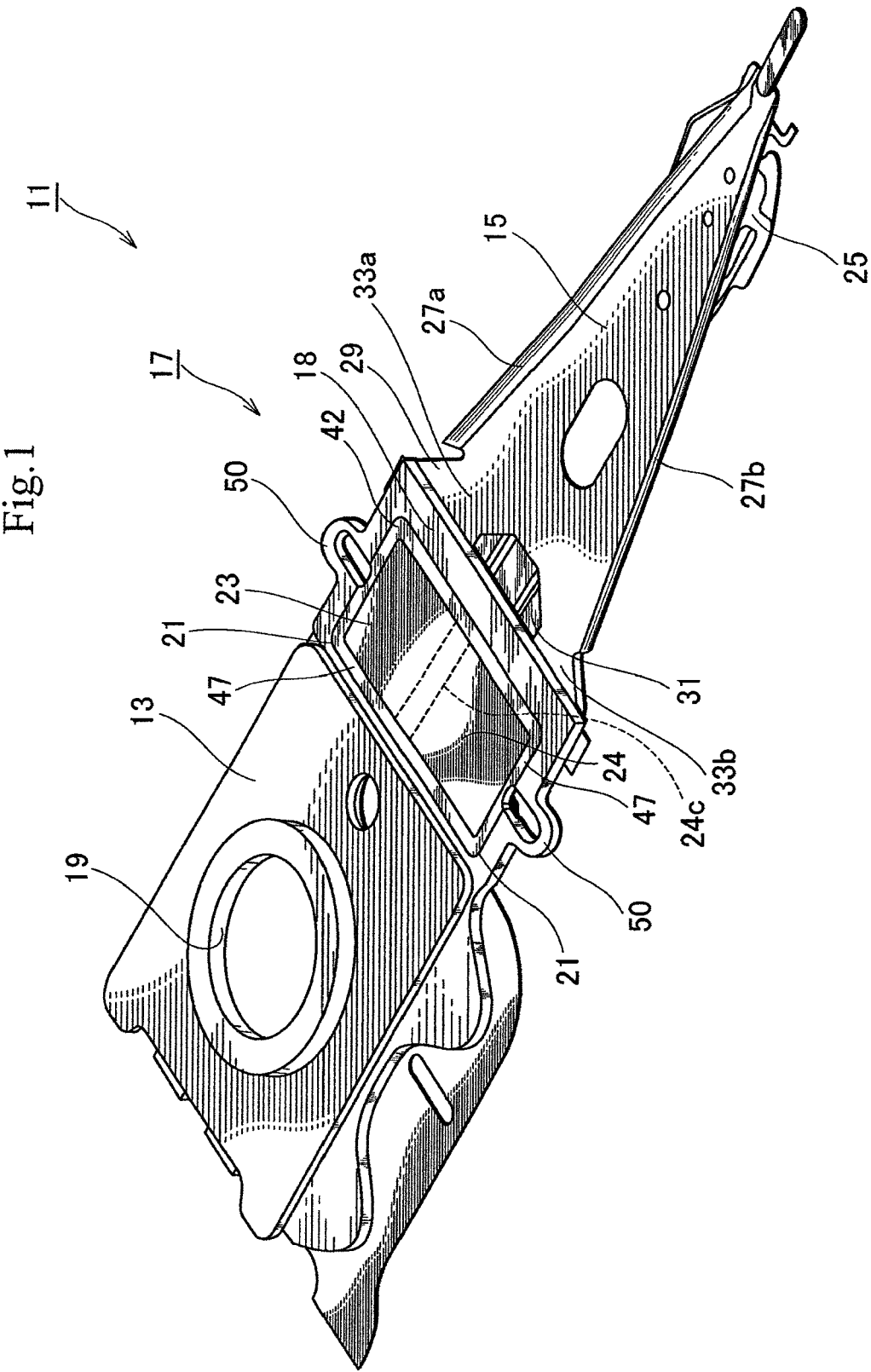
FIG. 1 is a perspective view illustrating a head suspension according to a first embodiment of the present invention.

FIG. 1 is a perspective view illustrating a head suspension 11 according to the first embodiment of the present invention. As shown in FIG. 1, the head suspension 11 has a base plate 13, a load beam 15, and a piezoelectric actuator 17.

The base plate 13 is a metal thin plate made of, for example, stainless steel and has a thickness of about 150 to 200 μm. The base plate 13 may be made of light metal such as aluminum alloy or a clad material including light metal and stainless steel. The light metal may reduce the inertia of the base plate 13, increase the resonant frequency of the head suspension 11 in a sway direction, i.e., a widthwise direction of the head suspension 11, and improve the tracing performance of the head suspension 11.

The base plate 13 has a circular boss 19. With the boss 19, the base plate 13 is attached to a front end of an actuator arm (not illustrated) and is turned by a voice coil motor (not illustrated). The base plate 13 has a front end proximate to the load beam 15 and a rear end opposite to the front end in a longitudinal direction orthogonal to the lateral direction. The front end of the base plate 13 is connected through the piezoelectric actuator 17 to the load beam 15. The details of the piezoelectric actuator 17 will be explained later.

The load beam 15 applies load onto a slider (not illustrated) attached to a front end of the load beam 15. The load beam 15 is a resilient metal thin plate made of, for example, stainless steel and has a thickness of about 30 to 150 μm. Like the base plate 13, the load beam 15 may be made of light metal such as aluminum alloy or a clad material including light metal and stainless steel.

The load beam 15 has a flexure 25 whose front end supports the slider that has a magnetic head. The load beam 15 has bent edges 27a and 27b extending across the sway direction, to reinforce the stiffness of the load beam 15.

A rear end of the load beam 15 is integral with a connection plate 29. The connection plate 29 is a resilient metal thin plate made of, for example, stainless steel and has a thickness of about 30 μm. The connection plate 29 has a hole 31. The hole 31 reduces the thickness-wise bending stiffness and weight of the connection plate 29. On each side of the hole 31, the connection plate 29 has hinges 33a and 33b that is bendable in a thickness direction. A rear end of the connection plate 29, i.e., a base part of the load beam 15 is attached to a front end of the piezoelectric actuator 17.

Figure 4:
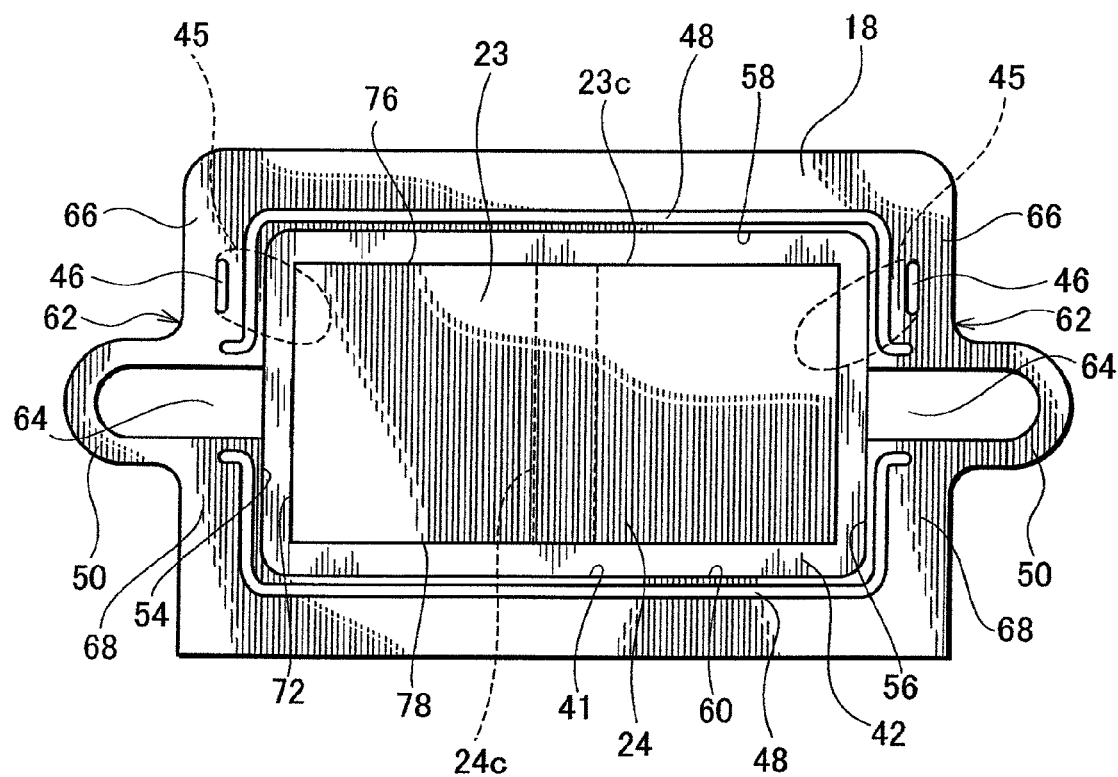
FIG. 4 is a plan view illustrating a piezoelectric actuator according to a modification of the first embodiment.

The piezoelectric actuator 17 that is an essential part of the head suspension 11 according to the first embodiment will be explained. FIG. 2 is a plan view illustrating the piezoelectric actuator 17 and FIGS. 3A to 3C are sectional views taken along a line A-A of FIG. 2, in which FIG. 3A illustrates an adhesive diffusing state according to a comparative example and FIGS. 3B and 3C illustrate an adhesive stopped state according to the first embodiment. FIG. 4 is a plan view illustrating a piezoelectric actuator according to a modification of the first embodiment.

When designing the piezoelectric actuator 17, considerations must be made to effectively transfer a distortion (displacement) of a piezoelectric element 23 of the piezoelectric actuator 17 to the load beam 15, secure electric insulation between an electrode of the piezoelectric element 23 and an actuator base 18, prevent dust from dropping off a circumferential side face 23c of the piezoelectric element 23, protect the brittle piezoelectric element 23 from being damaged, and keep a proper appearance when attaching the piezoelectric element 23 to an opening 21 of the actuator base 18.

In consideration of these points, the piezoelectric actuator 17 of the first embodiment is accomplished.

The piezoelectric actuator 17 functions to support a base part of the load beam 15 and move a front end of the load beam 15 in a sway direction (a widthwise direction of the load beam 15). The piezoelectric actuator 17 includes the actuator base 18 and piezoelectric element 23.

The actuator base 18 is a metal thin plate made of, for example, stainless steel, interposes between the base plate 13 and the load beam 15, and is a discrete part with respect to the base plate 13 and load beam 15. A front end of the actuator base 18 is on the load beam 15 and a rear end thereof is on the base plate 13.

A bottom face of the front end of the actuator base 18 is laid on the rear end of the connection plate 29, i.e., the base part of the load beam 15 and is fixed thereto by, for example, laser welding. The front end of the base plate 13 is laid on the rear end of the actuator base 18 and is fixed thereto by, for example, laser welding.

The actuator base 18 may be integral with the base plate 13. In this case, pressing, for example, is employed to punch the integrated base plate 13 and actuator base 18 out of a metal thin plate made of, for example, stainless steel.

The integrated base plate 13 and actuator base 18 is also referred to as "actuator base". Namely, according to the present invention, the "actuator base" can represent both the base plate 13 and actuator base 18.

In FIG. 2, the actuator base 18 has the opening 21 accommodating the piezoelectric element 23. In FIG. 2 and other drawings, a front end of the actuator base 18 is on an upper side of the drawings. The opening 21 has a rectangular shape elongated in a width direction of the head suspension 11 and is defined with a circumferential edge 41 in the actuator base 18. The circumferential edge 41 includes a left edge 54, a right edge 56, a front edge 58, and a rear edge 60. The left and right edges 54 and 56 are defined by walls 62.

Each wall 62 is on an outer side of the opening 21 and is integral with the actuator base 18. Substantially at a longitudinal center, the wall 62 has a cut 64 that divides the wall 62 into a front wall 66 and a rear wall 68. The front and rear walls 66 and 68 are connected to each other with a flexible link 50.

Ends of the flexible link 50 are integral with ends of the front and rear walls 66 and 68 of the wall 62. An intermediate part of the flexible link 50 has a U-shape that outwardly protrudes. The flexible links 50 on each side of the opening 21 function to improve the stiffness of the piezoelectric actuator 17 and bend during a sway operation of the piezoelectric actuator 17 so as not to prevent a displacing stroke of the piezoelectric actuator 17.

The opening 21 is provided with a bottom receiver 43 having a flange shape as illustrated in FIGS. 3B and 3C. The bottom receiver 43 is integral with a lower end of the circumferential edge 41 of the opening 21 and inwardly protrudes from the circumferential edge 41. The bottom receiver 43 is formed by partly thinning the actuator base 18 by, for example, half-etching.

The bottom receiver 43 has a communication hole 70 that connects the opening 21 to a bottom face side of the actuator base 18.

The opening 21 receives the piezoelectric element 23. The piezoelectric element 23 deforms in response to a voltage applied to an electrode 24 thereof, so that the piezoelectric actuator 17 moves the front end of the load beam 15 in a sway direction.

The piezoelectric element 23 has a thickness of about 0.07 mm to 0.20 mm and is made of piezoelectric ceramics such as PZT (piezoelectric zirconate titanate). The piezoelectric element 23 has a rectangular shape whose outer dimensions are slightly smaller than inner dimensions of the opening 21. The piezoelectric element 23 has the circumferential side face 23c that faces the circumferential edge 41 of the opening 21.

The circumferential side face 23c includes left and right side faces 72 and 74 facing the left and right edges 54 and 56 of the opening 21, respectively, and front and rear side faces 76 and 78 facing the front and rear edges 58 and 60 of the opening 21, respectively.

The piezoelectric element 23 has top and bottom faces provided with electrodes 24, respectively. The electrodes 24 are made of a conductive material such as gold (Au) having a low contact resistance. The electrodes 24 may be made by proper means such as vapor deposition, spattering, and plating. The electrodes 24 include a top electrode 24a and a bottom electrode 24b.

The top electrode 24a on a top face 23a of the piezoelectric element 23 is substantially flush with a top face of the actuator base 18. The top electrode 24a is divided by a non-electrode part 24c into left and right electrode segments. The top electrode 24a of each electrode segment is grounded through conductive resin 45 to a conductive part 46 formed on the actuator base 18. The conductive resin 45 is a wiring part made by curing conductive paste such as silver paste.

The conductive part 46 is a terminal made by removing a nonconductive film on the surface of the actuator base 18. The conductive part 46 secures electrical conduction with respect to the electrode 24 of the piezoelectric element 23.

The bottom electrode 24b on a bottom face 23b of the piezoelectric element 23 has a periphery opposing the bottom receiver 43 of the opening 21 in a thickness direction. Namely, the bottom receiver 43 of the opening 21 opposes the periphery of the bottom face 23b of the piezoelectric element 23c. An inner side of the bottom electrode 24b faces the outside of the bottom face of the actuator base 18 through the communication hole 70 of the bottom receiver 43. The bottom electrode 24b is connected through a conductive material such as a bonding wire to copper wiring (not illustrated) of the flexure 25.

When the piezoelectric element 23 is set at a predetermined position in the opening 21, the circumferential edge 41 of the opening 21 substantially entirely surrounds the circumferential side face 23c of the piezoelectric element 23, to form a circumferential gap between them. This gap is a circumferential channel 42 between the circumferential side face 23c of the piezoelectric element 23 and the circumferential edge 41 of the opening 21. Also, the bottom electrode 24b of the piezoelectric element 23 forms a predetermined gap 44 with respect to the bottom receiver 43 of the opening 21.

In the circumferential channel 42 and gap 44, a nonconductive adhesive 47 is filled and solidified. The nonconductive adhesive 47 may be any known nonconductive adhesive, or any conductive adhesive containing insulating material such as silica particles or glass particles.

The nonconductive adhesive 47 fills the space between the circumferential side face 23c of the piezoelectric element 23 and the circumferential edge 41 of the opening 21 and joins the piezoelectric element 23 and opening 21 together. In addition, the adhesive 47 fills the space between the bottom electrode 24b of the piezoelectric element 23 and the bottom receiver 43 of the opening 21 and joins the piezoelectric element 23 and opening 21 together. Consequently, the head suspension 11 of the first embodiment effectively transfers a distortion (displacement) of the piezoelectric element 23 to the load beam 15.

When setting the piezoelectric element 23 in the opening 21, it is preferable to align a center axis of the actuator base 18 in a thickness direction with a center axis of the piezoelectric element 23 in the thickness direction. This prevents a torsional motion of the piezoelectric actuator 17 during a sway operation.

As illustrated in FIG. 2, a trap 48 is a groove formed on the actuator base 18 outside the opening 21. The trap 48 extends along the edge of the opening 21 on the load beam 15 side of the actuator base 18, to surround the load beam 15 side of the opening 21.

More precisely, the trap 48 is formed along front parts of the left and right edges 54 and 56 of the circumferential edge 41 of the opening 21 and along the front edge 58 of the circumferential edge 41. The trap 48 holds the nonconductive adhesive 47 oozing out of the circumferential channel 42, thereby preventing the adhesive 47 from spreading.

The depth of the trap 48 is set to be about one third of the thickness of the actuator base 18 and is in the range of, for example, about 30 to 70 µm. The width of the trap 48 is set to be about one third of the width of the circumferential channel 42 and is in the range of, for example, about 30 to 70 µm.

The first embodiment is modifiable as illustrated in FIG. 4. The modification of FIG. 4 has another trap 48, which is also a groove, formed on the base plate 13 side of the actuator base 18. The two traps 48 substantially surround the opening 21 entirely.

The trap 48 on the base plate 13 side is symmetrical with the trap 48 on the load beam 15 side and extends along rear parts of the left and right edges 54 and 56 of the circumferential edge 41 of the opening 21 and along the rear edge 60 of the circumferential edge 41.

Steps of attaching the piezoelectric element 23 to the opening 21 of the actuator base 18 will be explained with reference to FIG. 5 that is a flowchart illustrating steps of attaching the piezoelectric element to the opening of the head suspension.

Step S1 applies the nonconductive adhesive 47 into portions corresponding to the circumferential channel 42 and the gap 44 around the opening 21 of the actuator base 18.

Figure 5:
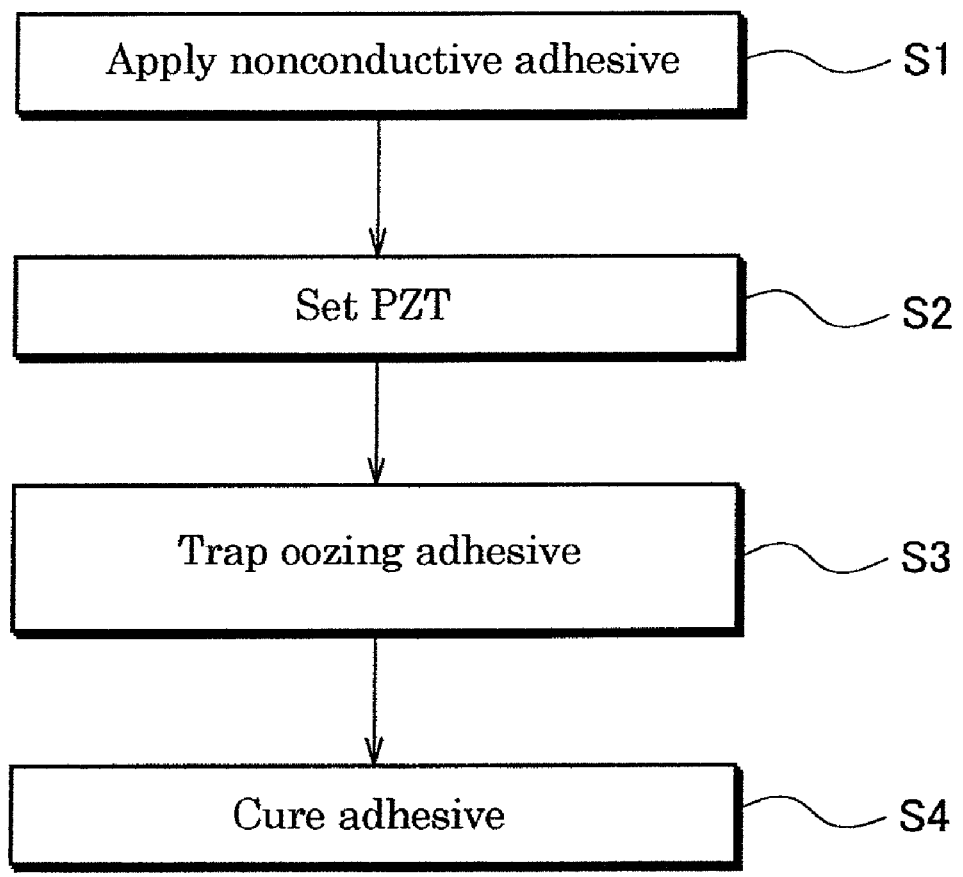
FIG. 5 is a flowchart illustrating steps of attaching a piezoelectric element to an opening of the head suspension according to the first embodiment.

Step S2 places the piezoelectric element 23 (indicated as "PZT" (piezoelectric transducer) in FIG. 5) at a predetermined position in the opening 21. At this time, the nonconductive adhesive 47 not cured yet in the circumferential channel 42 oozes out of the channel 42.

In step S3, the oozed adhesive 47 stops just before the trap 48 as illustrated in FIG. 3B, or flows into the trap 48 as illustrated in FIG. 3C.

Step S4 heat-treats the head suspension 11 with the piezoelectric element 23 attached to the opening 21, thereby curing the nonconductive adhesive 47. The heat treatment is carried out in, for example, an electric furnace at a predetermined temperature for a predetermined time. Consequently, the piezoelectric element 23 is fixed to the opening 21 of the actuator base 18 with the solidified nonconductive adhesive 47.

Operation of the head suspension 11 will be explained.

The piezoelectric actuator 17 displaces the front end of the load beam 15 in a sway direction according to deformation of the piezoelectric element 23 that occurs when a voltage is applied thereto. When applied a voltage, the piezoelectric element 23 deforms into a trapezoid with one longitudinal side thereof on one side of the non-electrode part 24c extending and the other longitudinal side thereof on the other side of the non-electrode part 24c contracting.

According to the directions and strokes of the extension and contraction of the piezoelectric element 23, the piezoelectric actuator 17 deforms to move the front end of the load beam 15 in a sway direction, i.e., a widthwise direction of the head suspension 11 for a very small distance.

In the piezoelectric actuator 17, the circumferential side face 23c of the piezoelectric element 23 is substantially entirely surrounded by the circumferential edge 41 of the opening 21. The gap between the circumferential side face 23c and the circumferential edge 41 is fixed with the nonconductive adhesive 47.

With this, the piezoelectric actuator 17 effectively transmits a distortion (displacement) of the piezoelectric element 23 through the nonconductive adhesive 47 and actuator base 18 to the load beam 15, thereby smoothly and correctly moving the front end of the load beam 15 in a sway direction.

According to the first embodiment, the bottom receiver 43 inwardly protrudes from the circumferential edge 41 of the opening 21 and faces the periphery of the bottom electrode 24b of the piezoelectric element 23. The gap between the bottom receiver 43 and the bottom electrode 24b is filled with the nonconductive adhesive 47, to surely fix the bottom electrode 24b to the bottom receiver 43 and support the piezoelectric element 23 from below. This results in smoothly and correctly moving the front end of the load beam 15 in a sway direction.

According to the first embodiment, the head suspension 11 has the trap 48, which is a groove, formed on the actuator base 18 outside the opening 21. The trap 48 holds the nonconductive adhesive 47 oozing out of the opening 21 and prevents the oozed adhesive from diffusing.

In the head suspension 11, therefore, the piezoelectric element 23 is neatly attached to the opening 21, to provide a good appearance. The nonconductive adhesive 47 does not contaminate the periphery of the opening 21 on the actuator base 18.

This results in smoothly and surely joining the actuator base 18 and connection plate 29 together by laser welding without interference by contamination.

When the nonconductive adhesive 47 is held in the trap 48, an end of the adhesive 47 on the actuator base 18 is contained in the trap 48. This prevents the adhesive 47 from peeling off the surface of the actuator base 18. Namely, the adhesive 47 surely attaches to the actuator base 18, thereby securing connection between the piezoelectric element 23 and the opening 21.

The nonconductive adhesive 47 in the circumferential channel 42 and trap 48 sandwiches the actuator base 18, thereby tightly attaching to the actuator base 18.

According to the first embodiment, the circumferential edge 41 of the opening 21 formed in the actuator base 18 of the head suspension 11 substantially surrounds the circumferential side face 23c of the piezoelectric element 23, to define the circumferential channel 42. In the circumferential channel 42, the nonconductive adhesive 47 is filled and cured. Namely, the space between the circumferential edge 23 of the opening 21 and the circumferential side face 23c of the piezoelectric element 23 is properly filled with the adhesive 47, to fix the piezoelectric element 23 to the opening 21 and secure electric insulation between the electrodes of the piezoelectric element 23 and the actuator base 18.

According to the first embodiment, the nonconductive adhesive 47 is filled and cured substantially entirely along the circumferential channel 42, to effectively transmit a distortion (displacement) of the piezoelectric element 23 to the load beam 15, prevent dust from dropping off the circumferential side face 23c of the piezoelectric element 23, and protect the piezoelectric element 23 that is brittle from being damaged.

According to the first embodiment, the opening 21, nonconductive adhesive 47, and piezoelectric element 23 join together, so that the joined body functions as an integrated support beam to improve the stiffness of the head suspension 11.

According to the first embodiment, the flexible links 50 are formed on each side of the opening 21. Each flexible link 50 has a U-shape that protrudes outwardly from the actuator base 18, to improve the stiffness of the piezoelectric actuator 17 without preventing a displacement stroke of the piezoelectric actuator 17 during a sway motion.

The head suspension 11 of the first embodiment, therefore, secures basic characteristics such as vibration and impact characteristics without deteriorating a displacement stroke of the piezoelectric actuator 17.

Figure 6:
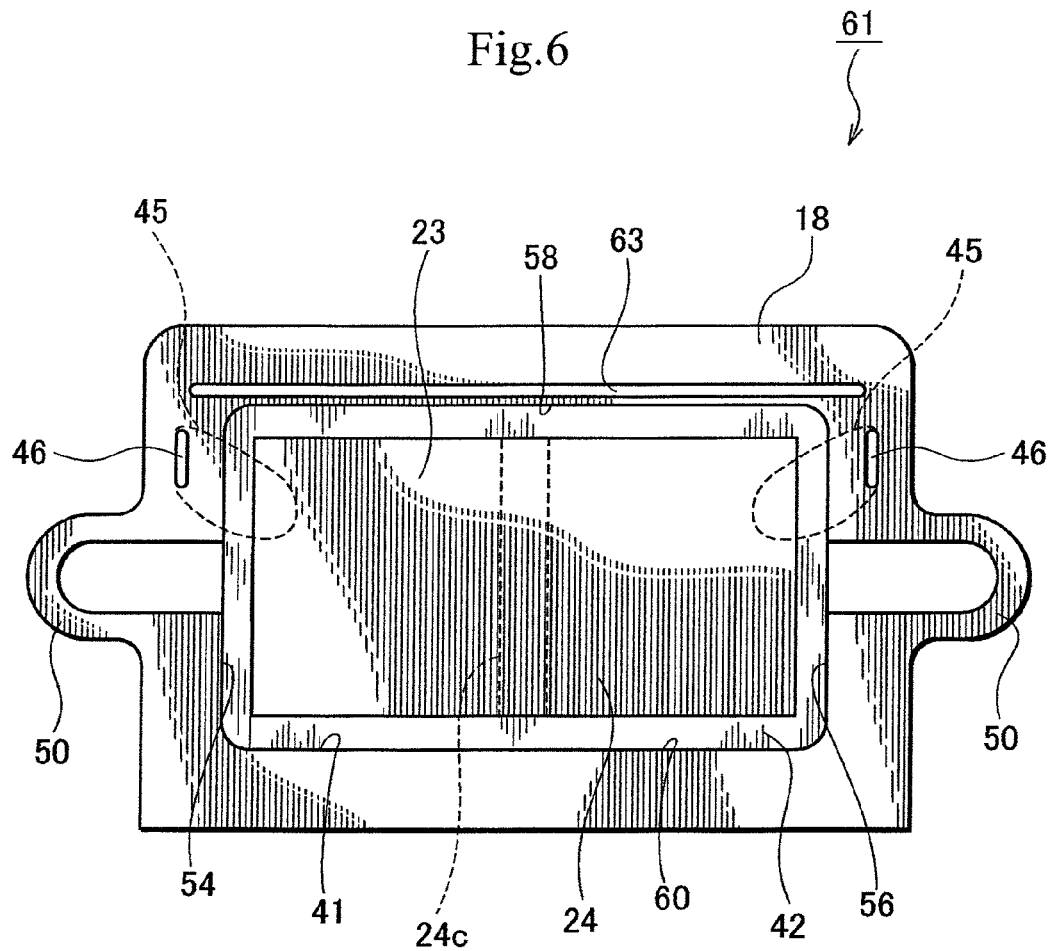
FIG. 6 is a plan view illustrating a piezoelectric actuator according to a second embodiment of the present invention.
Figure 7:
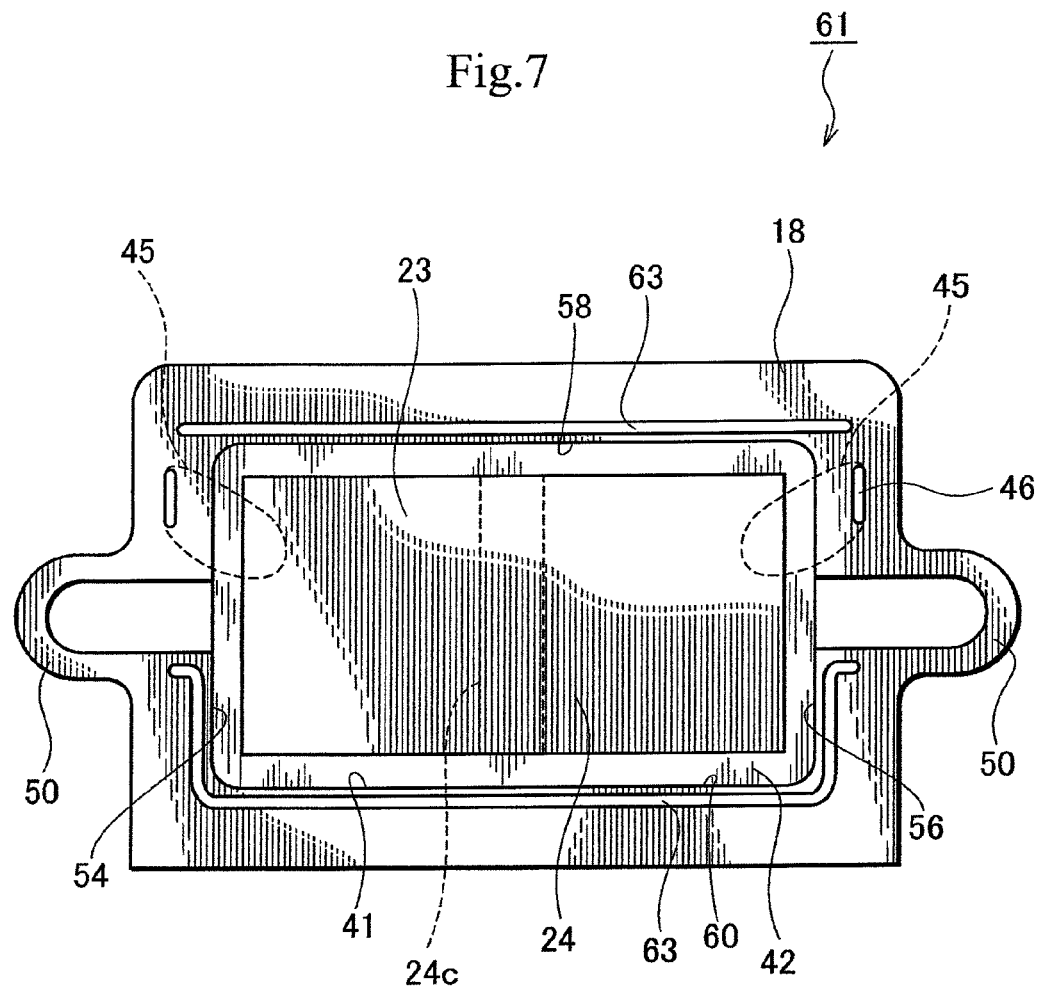
FIG. 7 is a plan view illustrating a piezoelectric actuator according to a modification of the second embodiment.

A head suspension according to the second embodiment of the present invention will be explained with reference to FIGS. 6 and 7 in which FIG. 6 is a plan view illustrating a piezoelectric actuator of the head suspension according to the second embodiment and FIG. 7 is a plan view illustrating a piezoelectric actuator according to a modification of the second embodiment.

Basic elements of the second embodiment are the same as those of the first embodiment, and therefore, a repetition of explanations is omitted and parts specific to the second embodiment will mainly be explained.

According to the first embodiment, the trap 48 is formed to surround an outer circumferential side of the opening 21 of the piezoelectric actuator 17. On the other hand, the second embodiment forms a trap 63, which is a groove, on an actuator base 18 partly along an outer circumferential side of an opening 21 of the actuator base 18.

More precisely, the trap 63 according to the second embodiment is linearly formed along a front edge 58 of a circumferential edge 41 of the opening 21 in an area on a load beam 15 side of the actuator base 18. The trap 63 extends in a sway direction. There is no trap 63 along left and right edges 54 and 56 of the opening 21. That is, there is no trap 63 between the piezoelectric element 23 and conductive parts 46.

The second embodiment provides the same effect as the first embodiment. In addition, the second embodiment smoothly secures electrical connection between the piezoelectric element 23 and the conductive parts 46 without interference of the trap 63.

According to the first embodiment (FIG. 2), the trap 48 is present between the piezoelectric element 23 and the conductive parts 46, and the conductive paste 45 may flow along the trap 48.

On the other hand, the second embodiment prevents the conductive paste 45 from flowing along the trap 63.

The second embodiment is modifiable as illustrated in FIG. 7. The modification of FIG. 7 additionally forms a trap 64, which is also a groove, in an area on a base plate 13 side of the actuator base 18. Like the first embodiment, the trap 64 on the base plate 13 side extends along rear parts of the left and right edges 54 and 56 of the circumferential edge 41 of the opening 21 and along a rear edge 60 of the circumferential edge 41.

Figure 8:
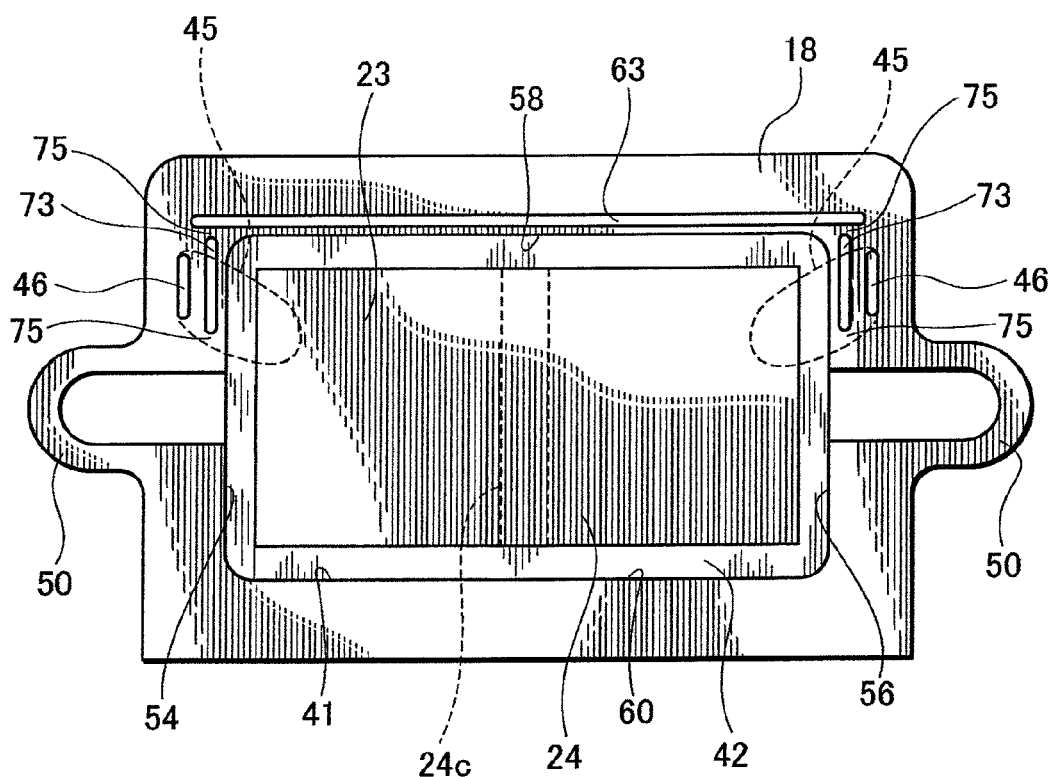
FIG. 8 is a plan view illustrating a piezoelectric actuator according to a third embodiment of the present invention.
Figure 9:
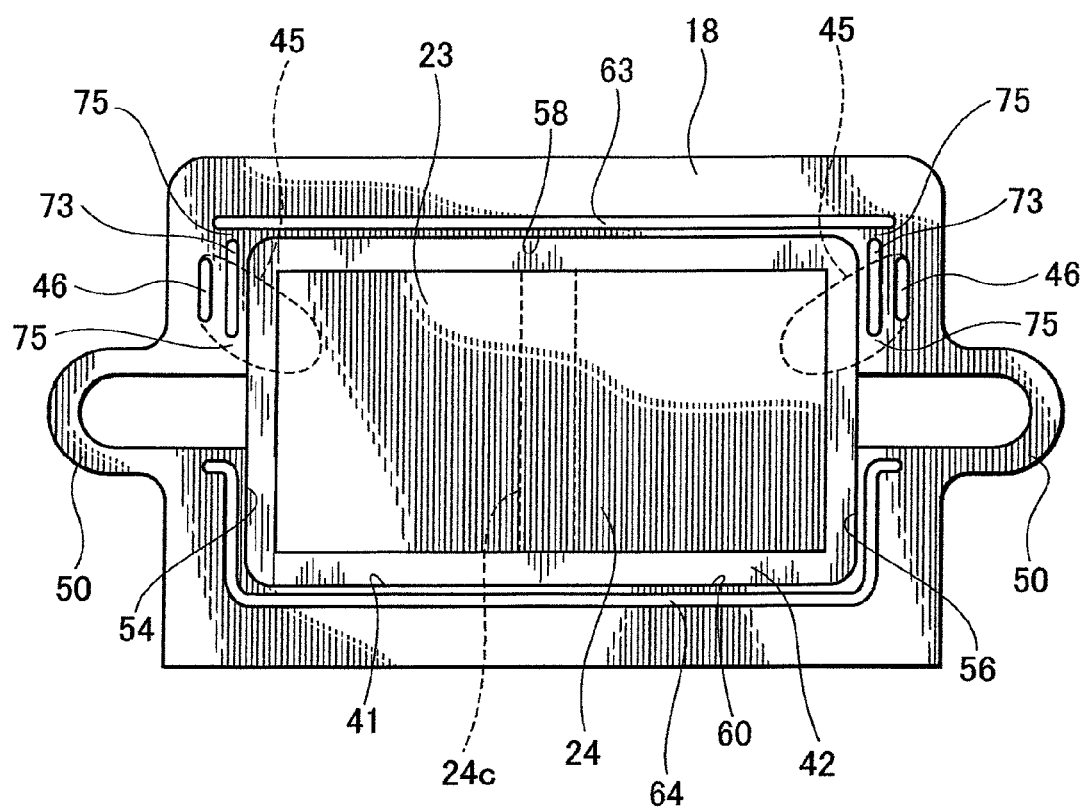
FIG. 9 is a plan view illustrating a piezoelectric actuator according to a modification of the third embodiment.

A head suspension according to the third embodiment of the present invention will be explained with reference to FIGS. 8 and 9 in which FIG. 8 is a plan view illustrating a piezoelectric actuator of the head suspension according to the third embodiment and FIG. 9 is a plan view illustrating a piezoelectric actuator according to a modification of the third embodiment.

Basic elements of the third embodiment are the same as those of the second embodiment, and therefore, a repetition of explanations is omitted and parts specific to the third embodiment will mainly be explained.

The third embodiment employs, in addition to the trap 63 of the second embodiment, a trap 73 that is a groove formed between a piezoelectric element 23 and each conductive part 46.

The trap 73 is linearly formed along a left (right) edge 54 (56) of a circumferential edge 41 of an opening 21. Namely, the trap 73 extends in parallel with the conductive part 46.

The trap 73 is separated from the trap 63 by a discontinuous part 75 that is a part of an actuator base 18 of the piezoelectric actuator 71. Namely, the discontinuous part 75 separates the traps 63 and 73 from each other. At least one trap (73) is arranged between the piezoelectric element 23 and the conductive part 46. It is possible to arrange a plurality of traps between the piezoelectric element 23 and the conductive part 46. According to the third embodiment, the trap 73 is longer than the conductive part 46 and is shorter than the trap 63.

The third embodiment provides the same effect as the second embodiment. In addition, the third embodiment arranges the discrete trap 73 between the piezoelectric element 23 and the conductive part 46, to improve the effect of preventing a conductive adhesive 47 from diffusing.

Since the trap 73 is separate from the trap 63, it functions to prevent a conductive paste 45 from flowing into the trap 63.

The third embodiment is modifiable as illustrated in FIG. 9. The modification additionally forms a trap 64, which is also a groove, on a base plate 13 side of the actuator base 18, like the modification of the second embodiment.

A head suspension according to the fourth embodiment of the present invention will be explained with reference to FIG. 10 that is a perspective view illustrating the head suspension.

Basic elements of the fourth embodiment are the same as those of the first to third embodiments, and therefore, a repetition of explanations is omitted and parts specific to the fourth embodiment will mainly be explained.

The fourth embodiment omits the pair of flexible links 50 of the first to third embodiments.

According to the fourth embodiment, the head suspension 81 has a piezoelectric actuator 83 having an actuator base 18 in which an opening 21 is formed. On each outer side of the opening 21, a clearance 52 instead of the flexible link 50 is formed.

Each clearance 52 is formed by cutting a wall 62 that forms an outer side of a circumferential edge of the opening 21. Namely, the clearance 52 defines a minute gap in a longitudinal central portion of the wall 62 to divide the wall 62 into a front wall 66 and a rear wall 68. By separating the actuator base 18 on each outer side of the opening 21, the clearances 52 allow a load beam 15 of the head suspension 81 to smoothly move in a sway direction.

The front wall 66 and rear wall 68 are close to each other so that a lateral dimension of the clearance 52 is larger than a longitudinal dimension thereof. With this, a nonconductive adhesive 47 is filled between the clearances 52 and a circumferential side face 23c of a piezoelectric element 23 embedded in the opening 21.

The nonconductive adhesive 47 is entirely filled and solidified in a circumferential channel 42 including parts between the circumferential side face 23c of the piezoelectric element 23 and the clearances 52.

In the head suspension 81 of the fourth embodiment, the piezoelectric actuator 83 has the trap of any one of the first to third embodiments.

In the head suspension 81 of the fourth embodiment, the opening 21, nonconductive adhesive 47, and piezoelectric element 23 are joined together to function as a solidified support beam. Accordingly, without using the flexible links 50 of the first to third embodiments, the fourth embodiment secures high stiffness for the head suspension 81.

The clearances 52 formed substantially at a central part on each outer side of the opening 21 do not block a displacement stroke of the piezoelectric actuator 83 in a sway direction.

The head suspension 81 of the fourth embodiment, therefore, secures basic characteristics such as vibration and impact characteristics without deteriorating a displacement stroke of the piezoelectric actuator 83.

The fourth embodiment reduces lateral dimensions of the head suspension 81, increases the number of parts to be taken out of materials, and improves the productivity of head suspensions.

The head suspension 81 according to the fourth embodiment has substantially the same width as standard head suspensions, and therefore, is manufacturable through an existing manufacturing line. This may reduce facility investment.

Producing the actuator base 18 according to the fourth embodiment may involve pressing and barreling. In this case, burrs will smoothly be removed from the actuator base 18 because the actuator base 18 has no protruding parts such as the flexible links 50 of the first to third embodiments. Namely, the fourth embodiment secures smooth work and reduces manufacturing costs.

When designing a magnetic disk drive in which the head suspension is installed, the head suspension 81 of the fourth embodiment involves no protruding parts such as the flexible links 50 of the first to third embodiments, and therefore, there is no need of considering interference with peripheral parts. This increases the degree of freedom in designing an arrangement of peripheral parts around the head suspension 81 in the magnetic disk drive.

In connection with vibration characteristics, the head suspension 81 according to the fourth embodiment has no protruding parts such as the flexible links 50 of the first to third embodiments, and therefore, there is no need of considering vibration modes that never occur on standard head suspensions. Accordingly, the head suspension 81 of the fourth embodiment, which demonstrates the effects of the first to third embodiments as well, can be designed through standard design steps.

Figure 11:
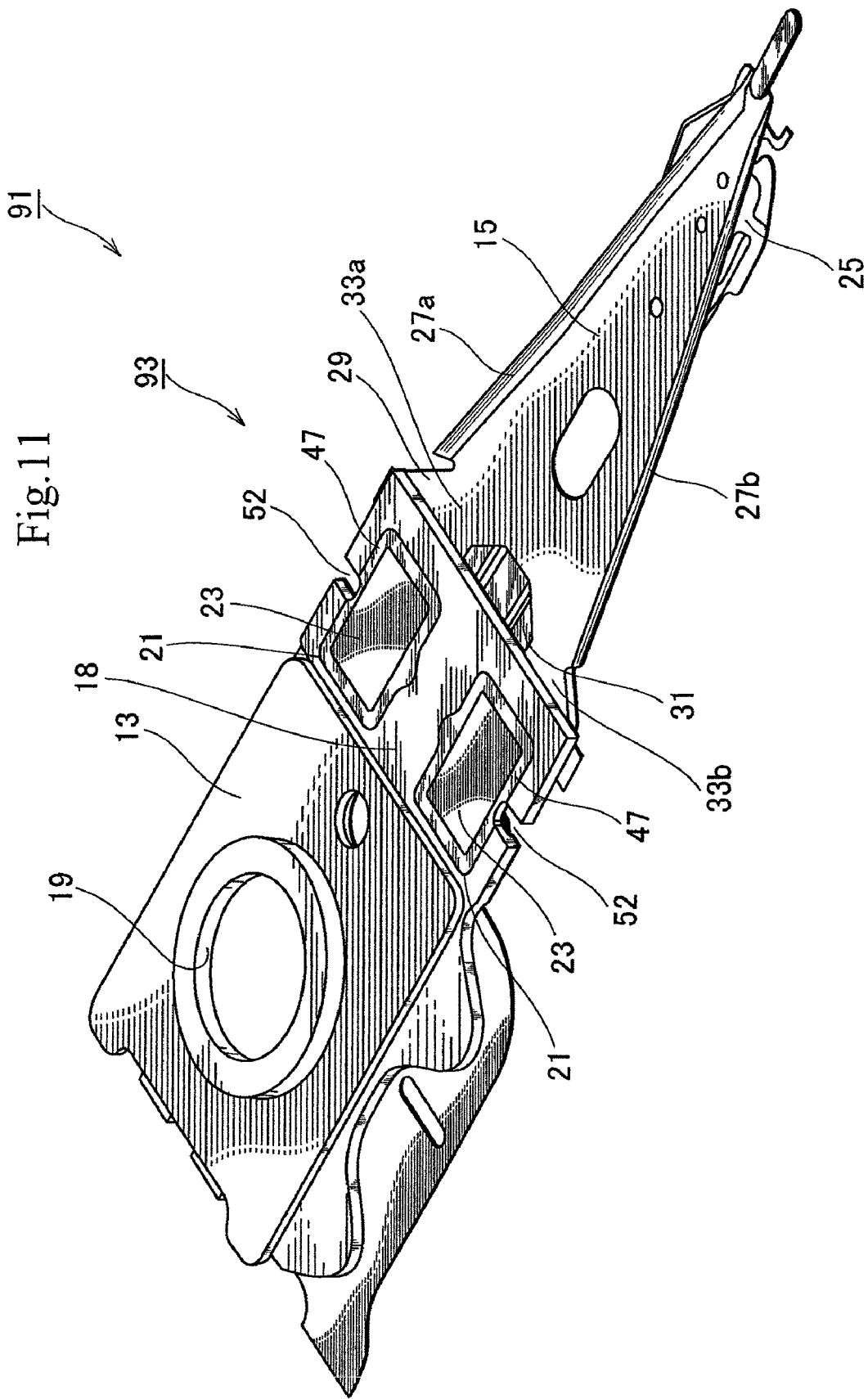
FIG. 11 is a perspective view illustrating a head suspension according to a fifth embodiment of the present invention.

A head suspension according to the fifth embodiment of the present invention will be explained with reference to FIG. 11 that is a perspective view illustrating the head suspension.

Basic elements of the fifth embodiment are the same as those of the fourth embodiment, and therefore, a repetition of explanations is omitted and parts specific to the fifth embodiment will mainly be explained.

Figure 10:
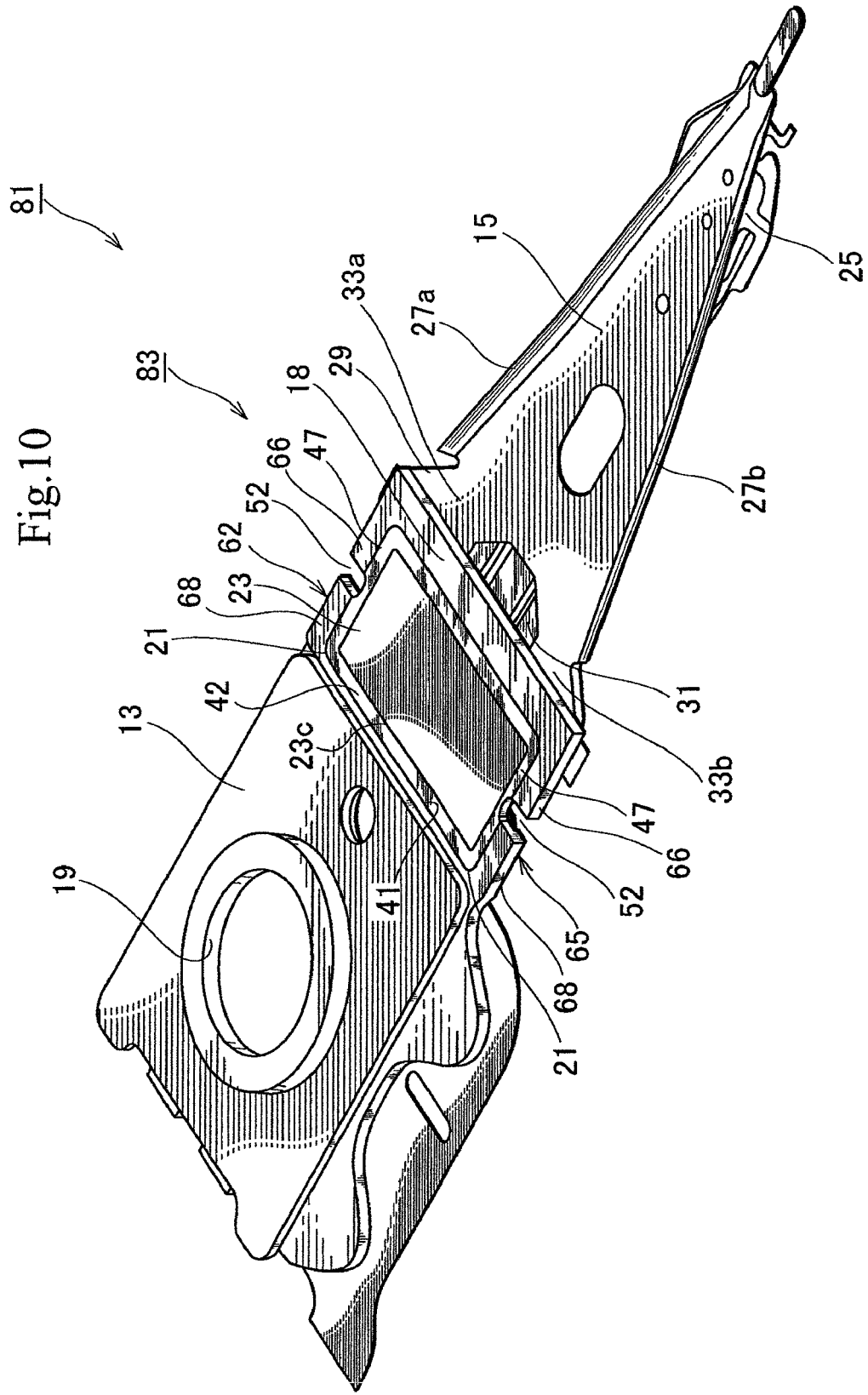
FIG. 10 is a perspective view illustrating a head suspension according to a fourth embodiment of the present invention.

According to the fourth embodiment of FIG. 10, the piezoelectric actuator 83 of the head suspension 81 employs a single piezoelectric element 23 arranged in a single opening 21. According to the fifth embodiment of FIG. 11, the head suspension 91 has a piezoelectric actuator 93 that employs two piezoelectric elements 23 arranged in two openings 21 of an actuator base 18, respectively.

The piezoelectric actuator 93 of the head suspension 91 according to the fifth embodiment has the trap of any one of the first to third embodiments.

The head suspension 91 of the fifth embodiment provides the same effect as the head suspension 81 of the fourth embodiment.

The present invention is not limited to the embodiments mentioned above and is modifiable according to the descriptions of the claims and specification without departing from the scope thereof.

The above-mentioned embodiments are based on an assumption that the head suspension is arranged above a magnetic disk in a magnetic disk drive so as to face the magnetic disk. In practice, the head suspension is also arranged below the magnetic disk so as to face the same. The present invention is applicable to each case by properly interpreting positional expressions in the explanations of the embodiments depending on the case.

What is claimed is:

1. A head suspension having a load beam and a piezoelectric actuator, the piezoelectric actuator supporting a base part of the load beam and configured to displace a front end of the load beam in a sway direction, the head suspension comprising:

the piezoelectric actuator having an actuator base and at least a piezoelectric element, the actuator base connected to the base part of the load beam and having at least an opening, the piezoelectric element attached to the opening and deforming in response to a voltage applied thereto to conduct displacement of the front end of the load beam;

a nonconductive adhesive filled between the piezoelectric element and the opening, to fix the piezoelectric element to the opening; and a trap formed on the actuator base outside the opening, configured to hold the nonconductive adhesive oozing out of the opening and prevent the oozed adhesive from spreading.

2. The head suspension of claim 1, wherein the opening and piezoelectric element each are substantially rectangular, and the trap is formed on the actuator base outside the opening along a circumferential edge of the opening.

3. The head suspension of claim 2, further comprising:

a conductive part formed on the actuator base to be electrically connected to the piezoelectric element;

a wiring part made of a solidified conductive paste arranged between the conductive part and the piezoelectric element;

a discontinuous part configured to divide the trap into a plurality of traps; and at least one of the plurality of traps being arranged between the conductive part and the piezoelectric element.

4. The head suspension of claim 1, further comprising:

a pair of flexible links formed on the actuator base on each side of the opening and each having a U-shape protruding outwardly from the opening.

5. The head suspension of claim 1, further comprising:

a pair of clearances each formed across the actuator base on an outer side of the opening.

6. The head suspension of claim 1, wherein the actuator base has two openings formed side by side in a width direction of the load beam, and the piezoelectric actuator has two piezoelectric elements arranged in the openings, respectively.

\* \* \* \* \*